UNITED STATES PATENT OFFICE.

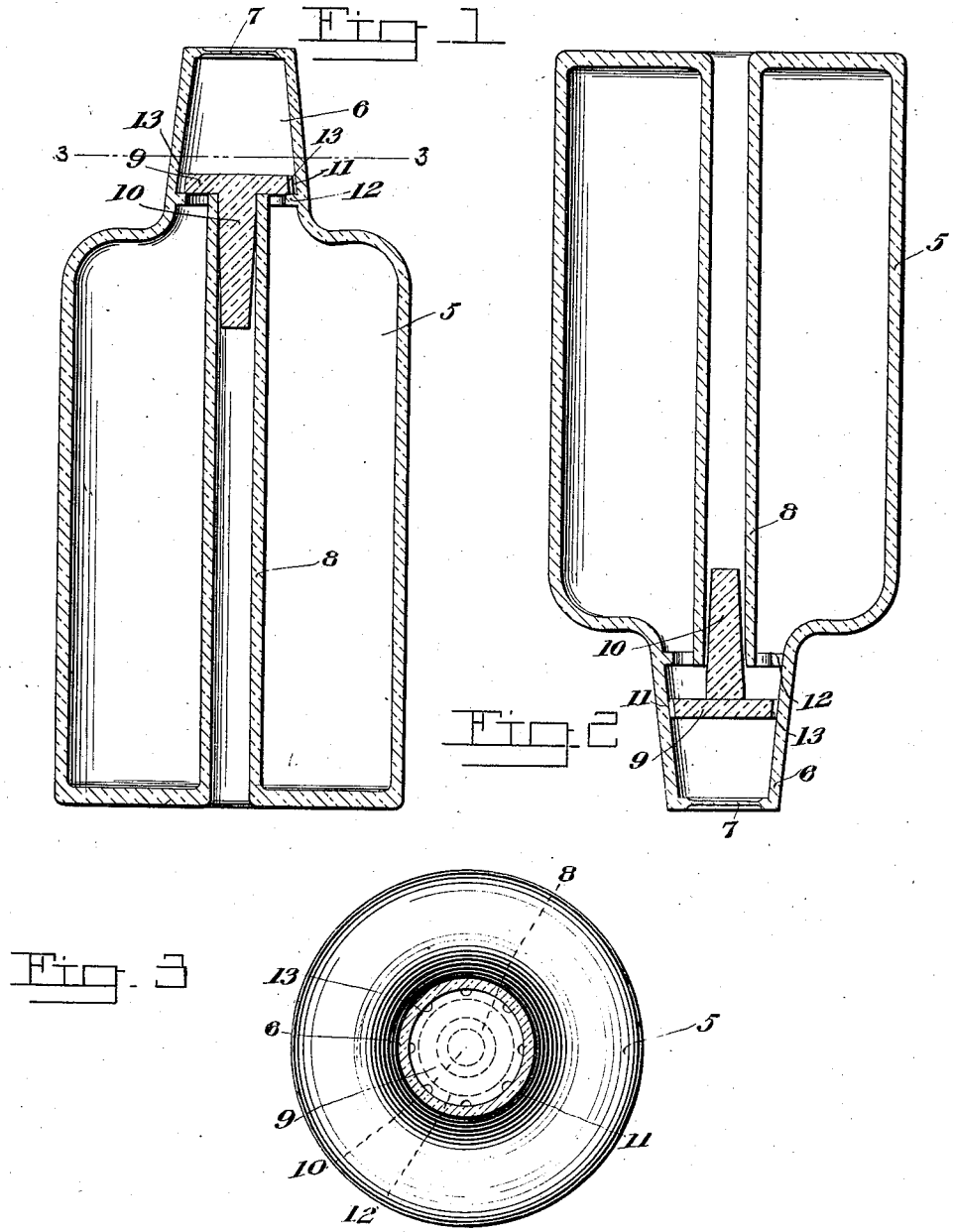

COATSWORTH E. RAUSSEAU, OF CLEARWATER, FLORIDA, ASSIGNOR OF ONE-HALF TO BERTRAM ALLEN, OF CLEARWATER, FLORIDA.

NON-REFILLABLE BOTTLE.

1,015,635.   Specification of Letters Patent.   Patented Jan. 23, 1912.

Application filed April 1, 1911. Serial No. 618,306.

*To all whom it may concern:*

Be it known that I, COATSWORTH E. RAUSSEAU, a citizen of the United States, residing at Clearwater, in the county of Hillsboro and State of Florida, have invented new and useful Improvements in Non-Refillable Bottles, of which the following is a specification.

The invention relates to bottles, and more particularly to the class of non-refillable bottles.

The primary object of the invention is the provision of a bottle in which fluid may be readily and easily introduced thereinto and dispensed therefrom, but on once filling the bottle, it will be impossible, after the contents has been discharged to again fill the same, thus assuring to the consumer the genuineness of the contents within the bottle.

Another object of the invention is the provision of a bottle in which the contents thereof may be readily and conveniently dispensed in varying quantities, as the occasion may require, although, after the entire dispensing of the contents, it will be impossible to refill the same, thus making the bottle useless after once emptied, and preventing the altering of the original contents or substituting in lieu thereof spurious fluid, thereby assuring to the consumer that the contents of the bottle is genuine.

A further object of the invention is the provision of a bottle of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a vertical longitudinal sectional view of a bottle constructed in accordance with the invention. Fig. 2 is a similar view of the bottle as shown in Fig. 1, the bottle being inverted. Fig. 3 is a sectional view on the line 3—3 of Fig. 1.

Similar reference characters indicate corresponding parts throughout the several views of the drawings.

Referring to the drawings by numerals, the bottle comprises a body 5 which may be of any desirable shape, preferably of a shape identical to the shape of bottles ordinarily used, having a contracted outwardly tapering neck 6, the mouth of which is normally closed by a breakable head or closure cap 7, the latter being preferably constructed from glass, and integral with the neck portion of the bottle.

Rising centrally from the bottom of the body 5 into the same and opening through the said bottom, is a filling tube 8, the free end of which extends upwardly into the body 5 and terminates spaced from the breakable head or cap 7, although preferably and as shown, the free end of this filling tube 8 terminates in a plane slightly above or beyond the juncture of the neck 6 with the body 5 of the bottle. Thus, it will be seen that on inverting the bottle, the same may be readily filled by introducing liquid into the filling tube 8, as the said liquid will flow into the body 5 therethrough.

Arranged within the neck 6 is a displaceable stopper, comprising a disk-like head 9 and a centrally tapering stem 10, integral therewith and depending from the same, the stem being adapted to telescope within the filling tube 8, and this stopper, when the bottle is in set-up position, has its disk-like head 9 resting upon the free end of the filling tube 8 within the bottle, so as to close the same. The disk-like head 9 of the stopper is provided with a beveled marginal edge 11, and said head is of less diameter than the interior diameter of the neck 6, contiguous the plane of the free end of the filling tube 8, so that the said stopper may be displaced upon inverting the bottle, whereby the head 9 will wedge into the neck 6 at a point spaced from the free end of the filling tube 8 within the body 5 of the bottle. In a plane with the free end of the filling tube 8 and projecting inwardly from the inner wall of the neck 6 of the bottle is an annular bearing seat 12, against which the head 9 of the stopper rests when the stopper is in normal position. The peripheral edge of the head 9 of the stopper is formed with a series of notches 13, which are normally closed by the bearing flange 12, when the stopper is in normal position, that is to say, when the bottle is in upright position or at rest. On inverting the bottle, the stopper is displaced from the free end of the filling tube 8 within the body 5 and the head 9 of the said stopper is caused to leave the bearing seat 12 within the neck 6, thereby opening the notches 13. Thus when the cap or head 7 is fractured, it is evident that the contents of the bottle will freely flow therefrom.

Prior to the inverting of the bottle for the discharging of the contents, a person fractures the breakable head or cap 7, and any particles of the cap thus broken will be prevented from dropping into the body 5 of the bottle by the presence of the stopper which is in position for normally closing the neck of the bottle. After the cap or head 7 has been fractured, it is only necessary to invert the bottle, thus causing the stopper to be displaced within the neck 6, whereupon the contents of the body 5 will freely flow through the notches 13 in the head 9 of the stopper and from the fractured mouth of the said bottle. It is evident that should any attempt be made to refill the bottle, it will be impossible to do so, because the stopper would interfere with the inflow of fluid within the body 5 of the bottle. Furthermore, by the presence of the fractured cap or head 7 of the bottle, it will indicate to a person that the bottle has been tampered with by an unscrupulous person and that the contents within the bottle is not genuine.

What is claimed is:

A bottle of the class described comprising a body having a contracted neck, a filling tube extending from the bottom of the body within the same and terminating within the neck on a plane parallel with a flange provided within the neck thereof, and a displaceable stopper arranged within the neck having a tapered stem telescoping within the tube acting as a guide.

In testimony whereof I affix my signature in presence of two witnesses.

COATSWORTH E. RAUSSEAU.

Witnesses:
   HELEN C. SHERIDAN,
   G. G. SHERIDAN.

---

Copies of this patent may be obtained for five cents each, by addressing the "Commissioner of Patents, Washington, D. C."